United States Patent
Iyangar et al.

(10) Patent No.: US 9,430,513 B1
(45) Date of Patent: Aug. 30, 2016

(54) METHODS AND APPARATUS FOR ARCHIVING SYSTEM HAVING POLICY BASED DIRECTORY RENAME RECORDING

(71) Applicant: EMC Corporation, Hopkinton, MA (US)

(72) Inventors: Sreenidhi R. Iyangar, Karnataka (IN); Ravi T. Edpuganti, Karnataka (IN)

(73) Assignee: EMC Corporation, Hopkinton, MA (US)

( * ) Notice: Subject to any disclaimer, the term of this patent is extended or adjusted under 35 U.S.C. 154(b) by 217 days.

(21) Appl. No.: 14/036,396

(22) Filed: Sep. 25, 2013

(51) Int. Cl.
*G06F 17/30* (2006.01)

(52) U.S. Cl.
CPC ... *G06F 17/30345* (2013.01); *G06F 17/30067* (2013.01); *G06F 17/30286* (2013.01)

(58) Field of Classification Search
None
See application file for complete search history.

(56) References Cited

U.S. PATENT DOCUMENTS

| | | | |
|---|---|---|---|
| 7,680,830 B1 * | 3/2010 | Ohr et al. | 707/999.2 |
| 7,913,053 B1 * | 3/2011 | Newland | 711/172 |
| 2009/0132543 A1 * | 5/2009 | Chatley et al. | 707/10 |

OTHER PUBLICATIONS

EMC[2] Release Notes, EMC® DiskXtender®, Release 6.5, Microsoft Windows Version, Release Notes P/N 300-011-218, Rev A01, Jul. 12, 2010, 10 pages.
EMC Centera Content—Addressable Storage, Archiving Made Simple, Affordable and Secure, May 2013, 4 pages. EMC[2], EMC Corporation.
EMC Diskxtender for Windows Overview, EMC2, 2011, EMC Corporation, 43 pages.

\* cited by examiner

*Primary Examiner* — Rehana Perveen
*Assistant Examiner* — Raheem Hoffler
(74) *Attorney, Agent, or Firm* — Daly, Crowley Mofford & Durkee, LLP

(57) ABSTRACT

Methods and apparatus for archiving files in a content addressable storage (CAS) system with support for folder renames on the CAS and optimizing the same by filtering unnecessary folder renames from being recorded on the CAS based on folder rename flush policy.

18 Claims, 11 Drawing Sheets

560

| Original path | New Path | DX server time | Centera time |
|---|---|---|---|
| 562 | 564 | 566 | 568 |
| E:\a\b\c | E:\a\k\c | 1-Jun-2013 10:00:00 | 1-Jun-2013 10:03:00 |
| E:\a\k\c | E:\a\1\c | 3-Jun-2013 15:00:00 | 3-Jun-2013 15:05:01 |
| F:\1\2\3 | F:\1\2\5 | 10-Aug-2013 20:00:00 | 10-Aug-2013 20:02:00 |
| . | . | . | . |
| . | . | . | . |
| . | . | . | . |
| . | . | . | . |
| | | | |

*FIG. 5B*

METHODS AND APPARATUS FOR ARCHIVING SYSTEM HAVING POLICY BASED DIRECTORY RENAME RECORDING

BACKGROUND

As is known in the art, file archiving systems are useful to move files for which there is not sufficient space on primary storage. The archiving of files allow for new data storage on primary storage while moving old or low priority data to secondary storage. Typically, a pointer or stub is left for data removed from primary storage by which the data can be pulled from secondary storage after archiving.

Based on a specified policy, files can be selected to be moved from primary storage to secondary storage. Files can be selected for movement to secondary storage based upon a variety of factors, such as last access date, size, type, user preference, etc. While secondary storage may provide access that is slower than primary storage, secondary storage can be relatively low-cost as compared with primary storage.

Primary storage is typically a LUN or a hard disk in server hardware. Secondary storage can be provided as disk, tape, EMC CENTERA content-addressable storage (CAS) platform for data archiving, EMC ATMOS cloud delivery platform to deliver and manage storage-as-a-service, etc. In general, secondary storage provides very large storage volumes at relatively low cost.

SUMMARY

The present invention provides methods and apparatus for selectively allowing or disallowing flushing of folder rename requests in a file archiving system to CAS secondary storage, based on an user configurable policy, e.g. "Folder rename flush policy". It is desirable at times to disallow unnecessary folder rename requests to be flushed to the CAS, such as when there is delayed archiving and folder needs to be renamed while having no archived files. A content address for a file is derived from file content and meta data, which includes its path. If a folder is renamed, the content address for each file under the folder needs to be re-computed, which is resource intensive. When the folder rename flush is enabled, the system supports folder renames on the CAS, which is more optimal and faster.

In one aspect of the invention, a method comprises: in a content addressable storage system, storing a file with an address derived from content of the file and metadata of the file, wherein the metadata for the file includes its path; receiving a rename request for the folder; filtering the flushing of folder rename request to the CAS based upon the folder rename flush policy; and adding, if the folder rename flush is allowed, the rename operation to a rename clip.

The method can further include one or more of the following features: the archive delay comprises a given period of time, the rename clip includes original path and new path information, logging rename paths in event logs, receiving cumulative rename requests for the folder, the cumulative rename requests include a rename request to the original folder name, and/or determining a correct path by replacing a sub string in original path for a file using the information in the rename clip.

In another aspect of the invention, an article comprises: at least one non-transitory computer-readable medium containing stored instructions that enable a machine to: in a content addressable storage system, storing a file with an address derived from content of the file and metadata of the file, wherein the metadata for the file includes its path; receiving a rename request for the folder; filtering the flushing of folder rename request to the CAS based upon the folder rename flush policy; and adding, if the folder rename flush is allowed, the rename operation to a rename clip.

In a further aspect of the invention, a file archiving system having content addressable storage, comprises: at least one processor; and at least one memory coupled to the at least one processor, the at least one processor and the at least one memory configured to: store a file with an address derived from content of the file and metadata for the file, wherein the metadata of the file includes its path; receive a rename request for the folder; filter the flushing of folder rename request to the CAS based upon the folder rename flush policy; and add, if the folder rename flush is allowed, the rename operation to a rename clip.

The system can further include one or more of the following features: the archive delay comprises a given period of time, the rename clip includes original path and new path information, and/or the at least one processor and memory are further configured to determine a correct path by replacing a sub string in original path for a file using the information in the rename clip.

BRIEF DESCRIPTION OF THE DRAWINGS

The foregoing features of this invention, as well as the invention itself, may be more fully understood from the following description of the drawings in which:

FIG. 5B is a logical representation of rename clip information;

DETAILED DESCRIPTION

Figure 1:
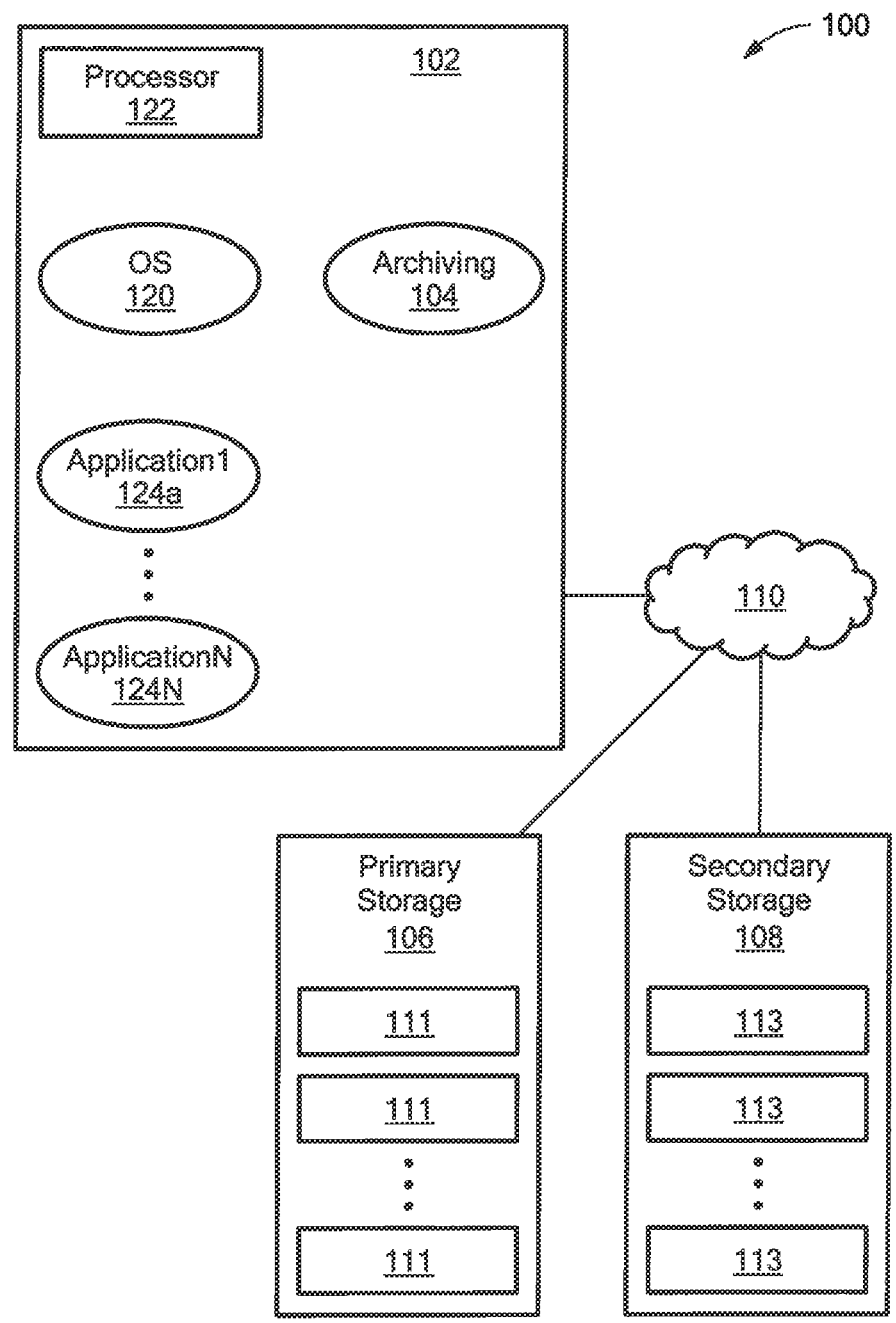
FIG. 1 is a schematic representation of an exemplary archiving system having selective path rename flush for folders in accordance with exemplary embodiments of the invention.

FIG. 1 shows an exemplary data storage system 100 including a server 102 having an automated policy-based file archiving module 104 that filters folder rename requests received from a user. In a content addressable system, each file is stored at a location based upon content and metadata, which includes path of the file. It may be desirable to prevent a folder rename flush to a CAS, such as CENTERA. In accordance with exemplary embodiments of the invention, the folder rename transaction flush to the CAS can be disabled, so that the rename transaction on a folder, which does not have archived files, will be discarded, such as when there is a policy-based file archiving delay, e.g., 30 days. It will be appreciated that serial renames of volatile folder names may be of limited utility. When a folder is renamed, to fix the file path meta-data for the file clips associated with the files under this folder, it can take enormous amounts of time depending on the number of files, which is addressed by using a rename clip to record renames.

In an exemplary embodiment, the server 102, such as a production server, is coupled to a primary storage system 106 and to a secondary storage system 108, such as by a network 110. Files 111 can initially be created and saved on the primary storage system 106. Based on various policies, files can be moved, for example, to secondary storage 108 from primary storage 106. The moved files 113 then reside in secondary storage 108.

In the illustrated embodiment, the archiving module 104 is provided as an application on a machine having a WINDOWS-based operating system 120 running on at least one computer processor 122 supporting any practical number of applications 124a-N. It is understood that the archiving module 104 can form part of any suitable hardware and/or software component. In an exemplary embodiment, the archiving module is provided as part of a WINDOWS based system. In other embodiments, other operating systems are used. In another embodiment, the archiving module forms a part of a data protection system.

In exemplary embodiments, the file archiving system 104 enables a user to perform operations on files. For example, in a move operation, a file is moved to the secondary storage 108 and it still resides on the primary storage 106. A purge operation replaces the file in the primary storage 106 with a stub. In a delete operation, a file can be deleted from primary and secondary storage 106, 108. In an index operation, a file can be indexed for searching without recalling the file from secondary storage 108.

In a WINDOWS environment, archiving module 104 provides an automated file archiving solution. It delivers a policy-based, file system-centric solution for migrating inactive data from a high-cost primary storage 106 to low-cost secondary storage 108, such as disk, tape, or optical devices. In exemplary embodiments of the invention, the archiving module 104 enables organizations to achieve data retention and compliance goals while maintaining service level agreements (SLAs), as well as reduce primary storage acquisition costs, management overhead, and backup and recovery times. In a data protection environment, an appliance, for example, supports replication of data over Fibre Channel to local SAN-attached storage and over WAN or Fibre Channel to remote sites, as well as failover to a local or remote replica enabling the user to continue operations from the replica in the event of a loss or disaster of the production data at the primary site.

In general, exemplary archiving modules are useful in environments that include:
  replication of primary file system data where archival is also required;
  replication of archived data (NAS media);
  replication of primary data that has been archived to content addressable storage, such as EMC CENTERA, for example
  replication of both primary file system data and archived data In general, the archiving system extends the amount of space available on a computer's local NTFS/ReFS volume by migrating files from the local drive to an external media, while making it appear that the files still reside on the local volume. The archiving system extends the storage capabilities of NTFS/ReFS volumes by using the file migration services of a file system manager (FSM) component. The storage media is available through communication with media services.

Figure 2:
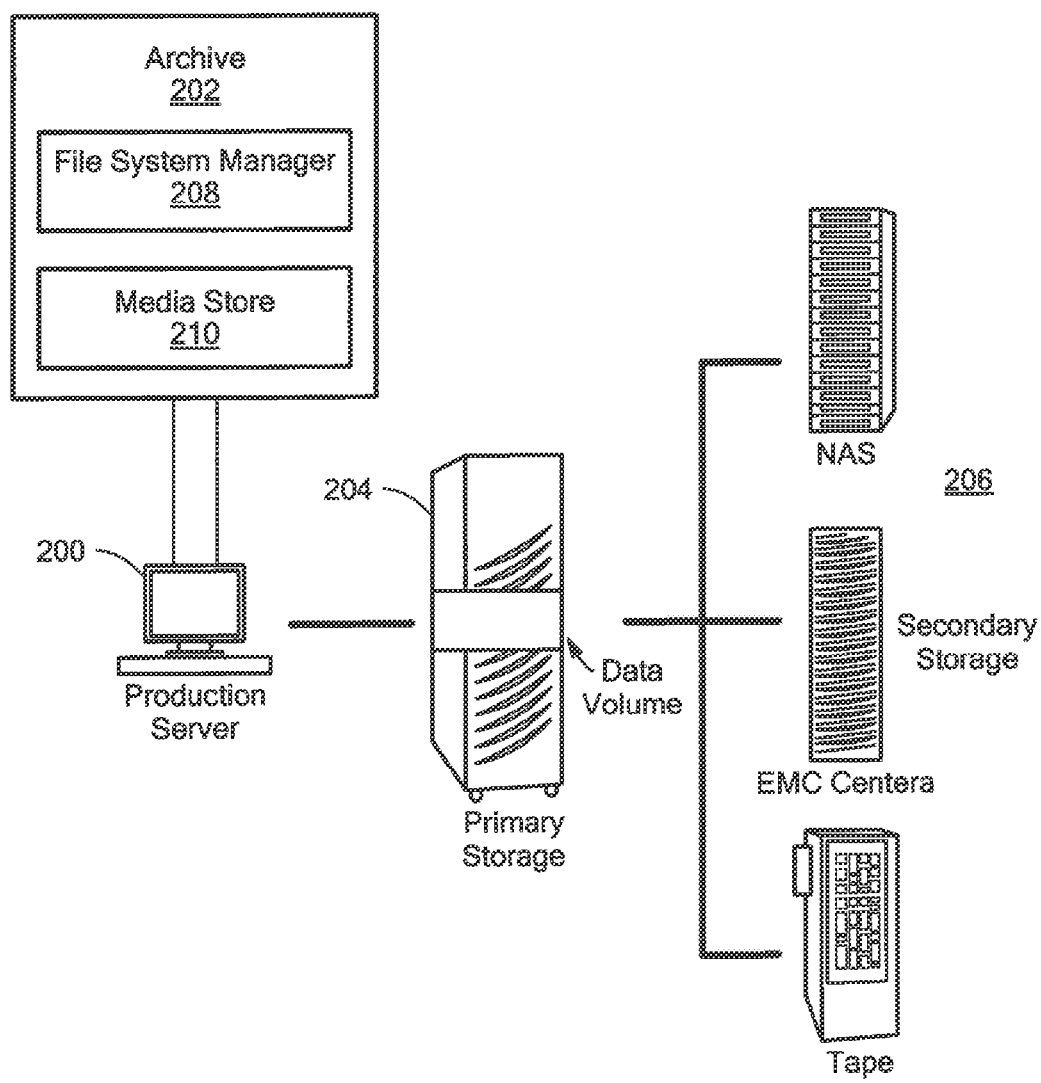
FIG. 2 is a schematic representation of a server including a file archiving module.

FIG. 2 shows an exemplary system including a production server 200 having an archiving module 202 for path renaming in accordance with exemplary embodiments of the invention. As files are created and saved on primary storage 204, the archiving module 202 targets candidate files for archiving. The archiving system moves files from primary 204 to secondary storage 206 and purges files from primary storage in accordance with respective policies.

The archiving module supports various media services, media types, and file systems, allowing the user to select the storage configuration best suited to available resources and storage needs of the organization. Files are moved to media by using a rule-based system that details criteria such as the age, size, type, and attributes of files for migration.

In an exemplary embodiment, the archiving module 202 includes a file system manager module 208 and a media store module 210. The file system manager 208 is a data mover and manages files saved to the extended drives to provide a storage solution. The archiving system 202 can use media services, such as media store module 210 to manage the external media to which the archiving module writes the files and to connect to various storage device types.

File migration services include moving files to media and fetching files from media, based on a set of defined parameters. While retrieving files from the extended drive, all files, whether on the extended NTFS/ReFS volume, or on the storage media, appear to be present locally on the NTFS/ReFS volume. The file system manager 208 automates the migration of files to storage media using a rule-based system to enable the creating of rules, such as move rule, purge rule, and delete rule to define the criteria for moving files from the extended drive to one or more pieces of storage media.

Figure 3:
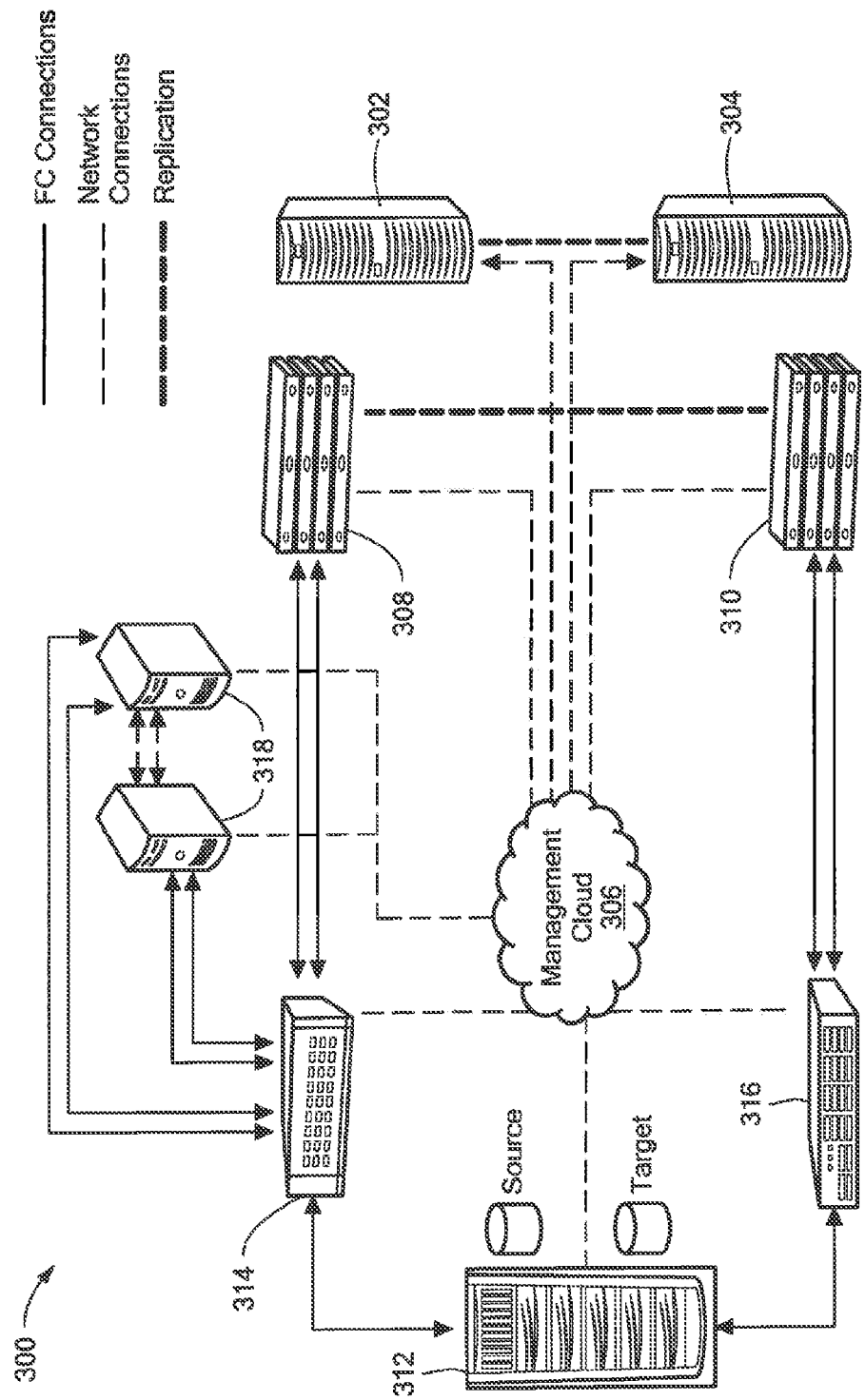
FIG. 3 is a schematic representation of a data protection system including a file archiving module.

In data protection environment 300 shown in FIG. 3, data is replicated over a distance. Data can be replicated locally within the same site using continuous data protection. Data can be replicated remotely continuous remote replication. Data can be replicated both locally and remotely using concurrent local and remote data protection. Replication of data is supported over Fibre Channel to local SAN attached storage and over WAN or Fibre Channel to remote sites.

The environment 300 includes production storage 302 and recovery storage 304 coupled to a cloud 306, such as a SAN network. A production journaling appliance 308 and a recovery journaling appliance 310 are coupled to storage 302, 304 via the network 306. Enterprise storage 312 is coupled to a source Fibre channel switch 314, which is coupled to the production appliance 308, and to a target Fibre Channel switch 316, which is coupled to the recovery appliance 310.

An archiving cluster 318 is coupled to the source switch 314 and the network 306. The general architecture of the illustrated data storage environment is well known to one of ordinary skill in the art. In an exemplary embodiment, the archiving cluster 318 provides folder rename functionality described more fully below. Illustrative files that can be archived by the cluster 318 include .pdf, MS OFFICE, .txt, .mp3, etc.

In general, to qualify files for archiving operations, files on the primary storage are scanned. Each file is then passed through a policy filter for each operation in a 'pipe' sequence. For example, a move operation is governed by a first policy, a delete operation is governed by a second policy, and so on. Each operation is governed by a separate policy.

Policies can be set based on a variety of file properties including:

File Size—e.g., file size greater than 100 Kb or less then 10 MB

Last Access time—e.g., file older than ten days since "Last Access Time"

Last modified time—e.g., file older than thirty days since "Last modified time"

Last creation time—file created fifteen days earlier

File attributes—file based on system attributes such as "System", "Hidden" etc.

File Extension—File based on extension such *.doc for word doc files.

Archive Delay—time until file archived, e.g., 30 days

In one aspect of the invention, an archiving system provides selective folder renaming in a content addressable storage system. The archiving system handles folder rename of the existing files stored in a storage type, such as content-based CENTERA storage by EMC, which is not natively supported by that storage type.

As is known in the art, content-addressable storage (CAS) stores information that can be retrieved based on content instead of storage location. CAS is well-suited for high-speed storage and retrieval of fixed content, i.e., data that does not change over time. CAS exposes a digest generated by a cryptographic hash function from the document it refers to. In general, the location of the actual data is unknown to the user. When information is stored in a CAS system, the system records a content address, which is an identifier uniquely and permanently linked to the information content itself. A request to retrieve information from a CAS system provides the content identifier, from which the system can determine the physical location of the data and retrieve it. Because the identifiers are based on content, any change to a data element, including meta-data, will change its content address.

When a new data element, or blob (binary large object), is added, the CAS device calculates a hash of the content and returns this hash as the content address. When a content address is provided to the device, it first queries the directory or folder for the physical location of the specified content address. The information is then retrieved from a storage node, and the actual hash of the data recomputed and verified. Once this is complete, the device can supply the requested data to the client.

A content address storage (CAS) device stores files in flat address space. A content address (CA) is generated for each file clip stored by the application. In exemplary embodiments, CA is generated based on file data and on meta data, which includes the full path of the file from where it is written. For example, millions of files represented with a hierarchical directory structure in the application are written in CA and blob combination in the CAS. When the user changes a folder/directory path, there would be a change in the path of files under that folder. Updating the metadata of all archived files under the renamed folder could be a very costly operation as it requires generation of a new content address for each file. If the directory rename happens at an upper directory, content address has to be generated for all the files under this directory. It is understood that the terms directory and folder are used interchangeably.

It is understood that renaming a folder or directory requires generating new CA for all files below this directory so that the storage application has to store new CA for all these files. If the number of files is thousands to millions, it may take days to months for this operation to complete. During this time, the CAS becomes busy and file recall may fail with application time-outs. Also, any unnecessary increase in the object count in CAS reduces the capacity of CAS. Further, during a disaster recovery scenario, files will be restored to old location and customer applications may not be able to access files resulting in data unavailability.

Figure 4:
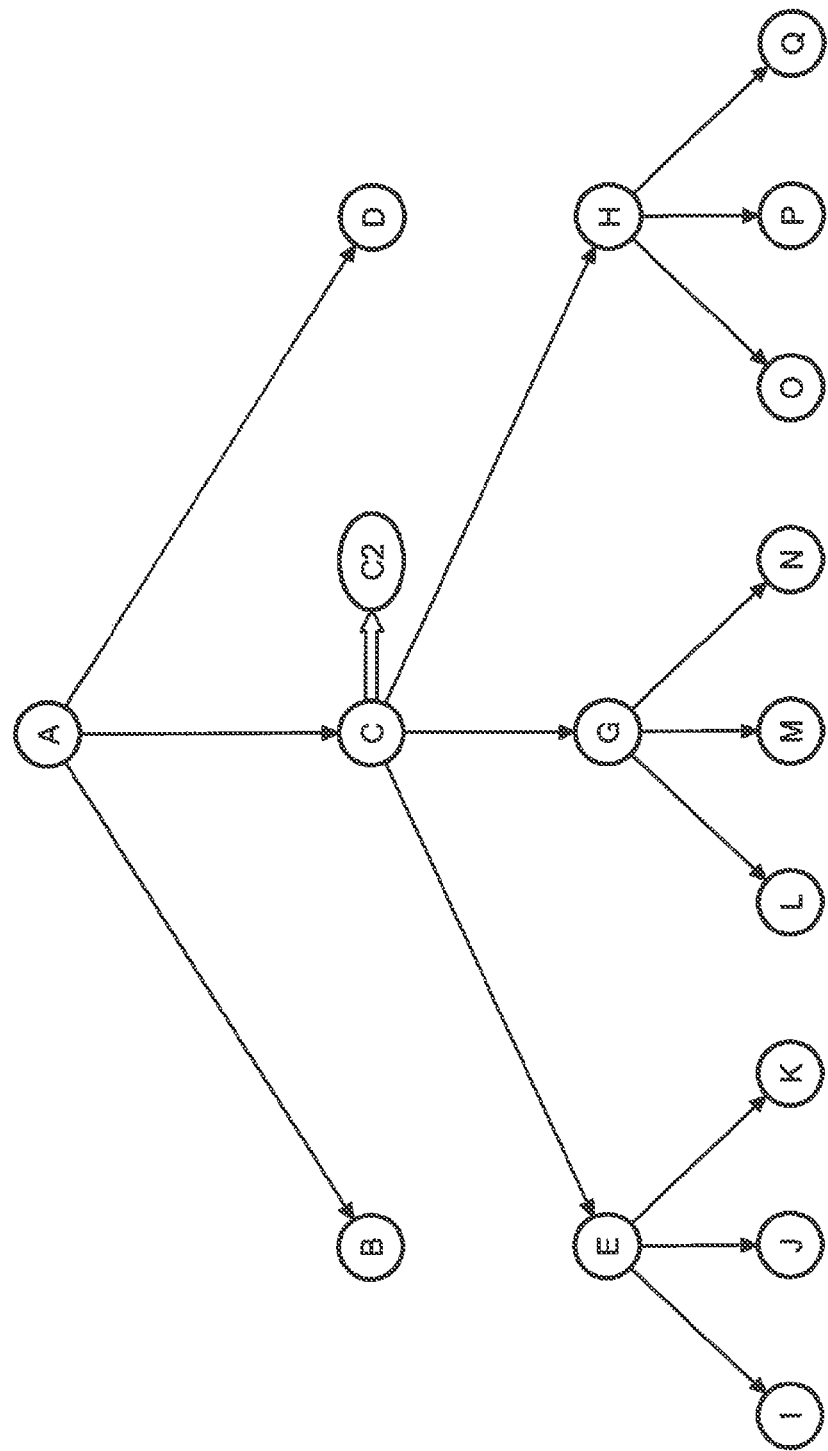
FIG. 4 is a diagram showing a user directory with path renaming.
Figure 4A:
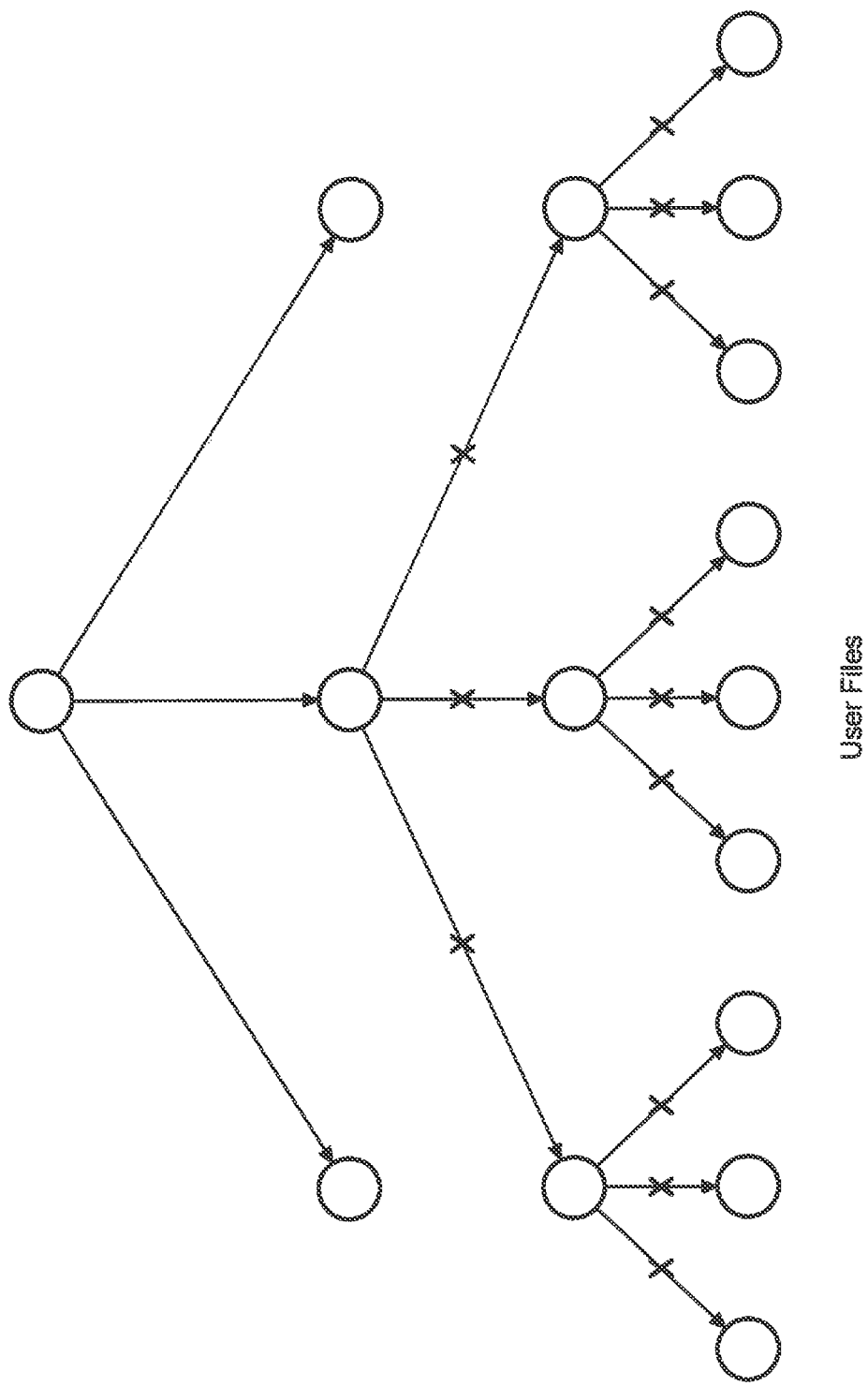
FIG. 4A is a diagram showing invalid paths of all files below the renamed directory C2.

Consider the user directory structure shown in FIG. 4. Files are present in each directory 'A'-'Q'. When a user renames a directory 'C' to 'C2', the path of all files below 'C2' become invalid, as shown in FIG. 4A. This new path meta data has to be flushed to CAS to regenerate the clip. In conventional systems, the archiving module on the server flushes the new path meta data to the CAS.

In some scenarios, it is not necessary to record(flush) all the path renames in a rename clip, which is described below. In a conventional archiving system, the renames are flushed to CAS as there is no way to control which renames should get recorded in the rename clip. This approach has certain limitations, such as excessive processing on the CAS side with unnecessary recording of renames, significant overhead during disaster recovery as irrelevant information is processed, and bloating rename clips in CAS with unnecessary details.

Figure 5:
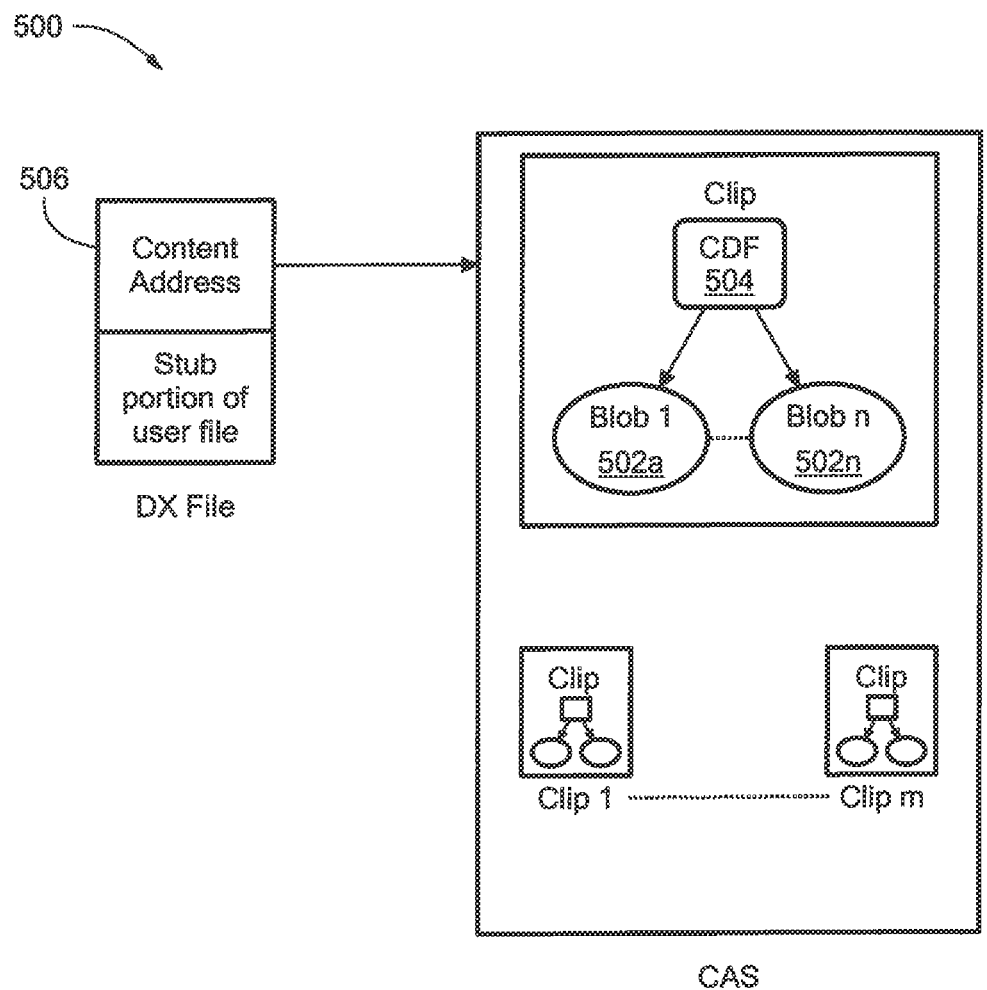
FIG. 5 is a representation of content address (CA) for a clip in a CAS.

FIG. 5 shows an exemplary CAS system 500 in which a data portion of a file resides in one or more blobs 502a-N and meta-data resides in a content descriptor (CDF) 504, which points to the blobs of the file. A purged file has a content address 506 pointing to its clip in the CAS.

In accordance with exemplary embodiments of the invention, an administrator can configure the archiving system to prevent/filter non-archived folder rename recordings to the CAS. This is desirable in scenarios in which there is policy-based delay for archiving of files.

For example, consider a user who has created a folder or directory named 'abc'. Files under 'abc' will be archived after thirty days according to set policy. There could be instances where within the thirty days the directory 'abc' or another directory below 'abc' is renamed multiple times in a short span of time. Recording volatile directory renames, where the directory has no files archived, will be of limited utility as will be readily appreciated by one of ordinary skill in the art.

When unnecessary renames like the ones described above are recorded in the rename clip, the archiving system bloats the rename clip with irrelevant information. As the size of CAS clip increases, additional overhead is created to update the folder rename clip(opening and updating the clip would take more time with the increase in clip size), whenever there is a folder rename flush. In addition, during disaster recovery, when the files are being restored, the unnecessary information has to be scanned through for processing the paths, which is a waste of computing resources. Further, these unnecessary transactions can cause pending operations like file recall to get delayed, even when no relevant information is being recorded.

Figure 5A:
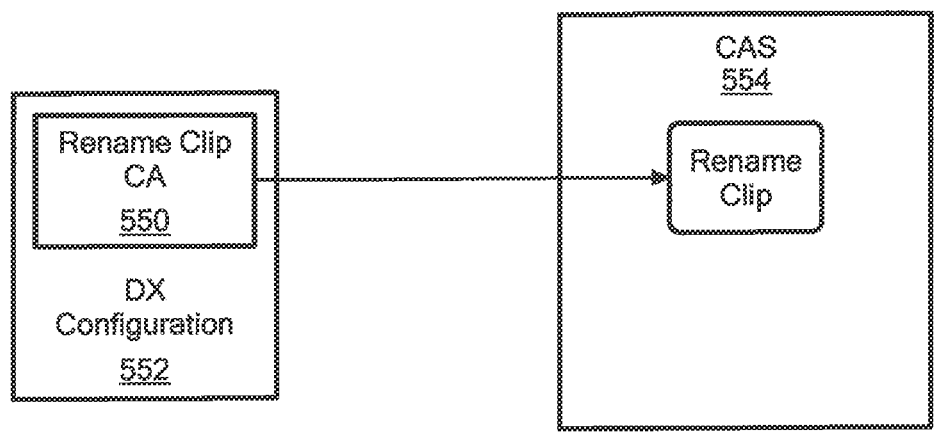
FIG. 5A is a representation of a rename clip for a CAS.

FIG. 5A shows an exemplary rename clip 550 having a content address CA stored by the server 552 point to a location in the CAS 554. The rename clip 550 contains the directory rename history. In an exemplary embodiment, the CA of the clip is stored in the registry.

FIG. 5B shows an exemplary logical representation 560 of the rename clip with path rename information including original path 562, new path 564, server time 566, and CAS time 568. Path rename information is recorded in the CDF portion of the rename clip for each access.

Figure 6:
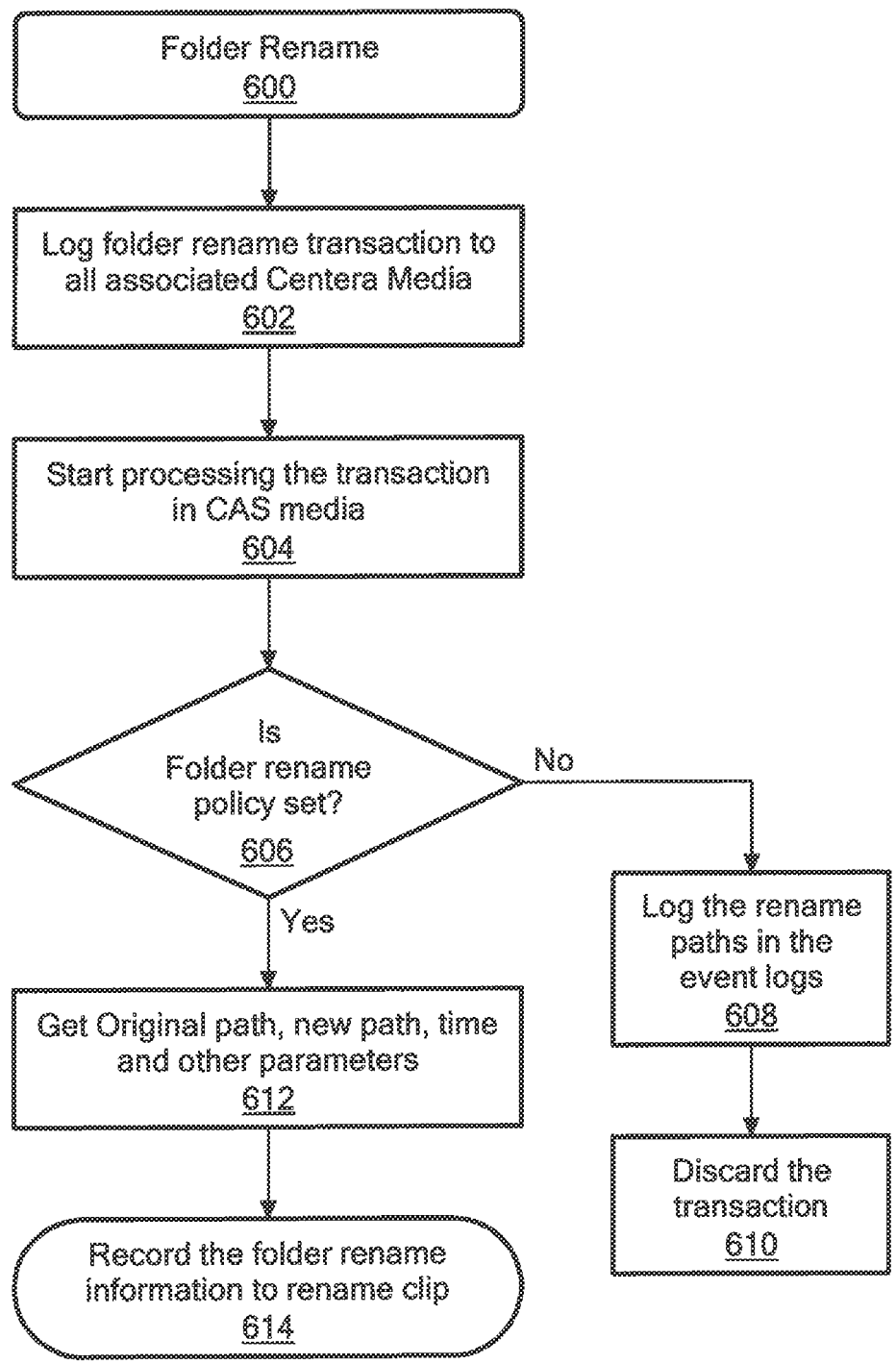
FIG. 6 is a flow diagram showing an exemplary sequence of steps for folder rename flush processing.

FIG. 6 shows an exemplary sequence of steps for handling a folder rename in accordance with exemplary embodiments of the invention. In step 600, a folder rename is received. In step 602, the folder rename transaction is logged to associated CAS. In step 604, processing of the rename transaction is initiated in the CAS. In step 606 it is determined whether the folder rename flush policy is set. If not, in step 608, the rename path is logged in the event logs. In step 610, the rename transaction is discarded.

If the folder rename policy is set, as determined in step 606, in step 612 the original path, the new path, and other parameters such as CAS time stamp and the production server time stamp, are obtained. In step 614, the folder rename information is recorded to the rename clip. If the Folder Rename Flush policy is not enabled, then in steps 608 and 610, the folder rename will be logged in the event log and discarded without recording in the rename clip.

In accordance with the above, folder rename transaction can be discarded based on folder rename flush policy or it can be processed. When the folder rename flush policy is set, the folder rename request will be recorded in the rename clip.

In general, an administrator sets the rename policy, whether to flush the folder rename transaction or not. The administrator configures the rename policy using a GUI. For example, the administrator selects an option to "Disable folder rename check (allow rename of all folders)" so that folder rename flushes will be discarded. The renames will not be recorded on to the rename clip in the CAS. When the administrator selects, for example "Prevent folder renames when not supported by media", folder renames are flushed and recorded in the rename clip present on the CAS.

The following further describes how a path rename is recorded when it is allowed. Path rename functionality is achieved without disturbing the content in the CAS by creating a rename clip in the CAS where the directory renames are recorded. When the user renames a directory in the local drive, the archiving server records the information, such as original path, new path, time when rename/s happened in the local server, CAS time and other meta-data.

Cumulative renames are also addressed. For example, directory 'A' gets renamed a number of time times: 'A' to 'B' to 'C' to 'D'. The original directory name 'A' becomes to 'B', 'C' and 'D' at different times. The archiving system handles different instances of the same directory with different names at different intervals of time. Let say files f10 . . . f15 will be moved while the directory name is 'A', files f20 . . . f25 are moved while the directory name is 'B', files f30 . . . f35 are moved while the directory name is 'C' and files f40 . . . f45 are moved while the directory name is 'D'. The archiving system gets back these files to the correct path i.e., to the folder D.

In one embodiment, the same directory can be changed to different names and original name could be brought back. For example, Directory 'A' changes to 'B.' A new directory 'A' is created at the same level. This new directory 'A' changes to 'C.' Another new directory 'A' is created the same level and renamed to 'D'. Now is renamed back to 'A'. The archiving system updates the same rename clip and records the rename history. Creating/updating the rename clip happens asynchronously so that user does not need to wait until the new clip is generated.

Figure 7:
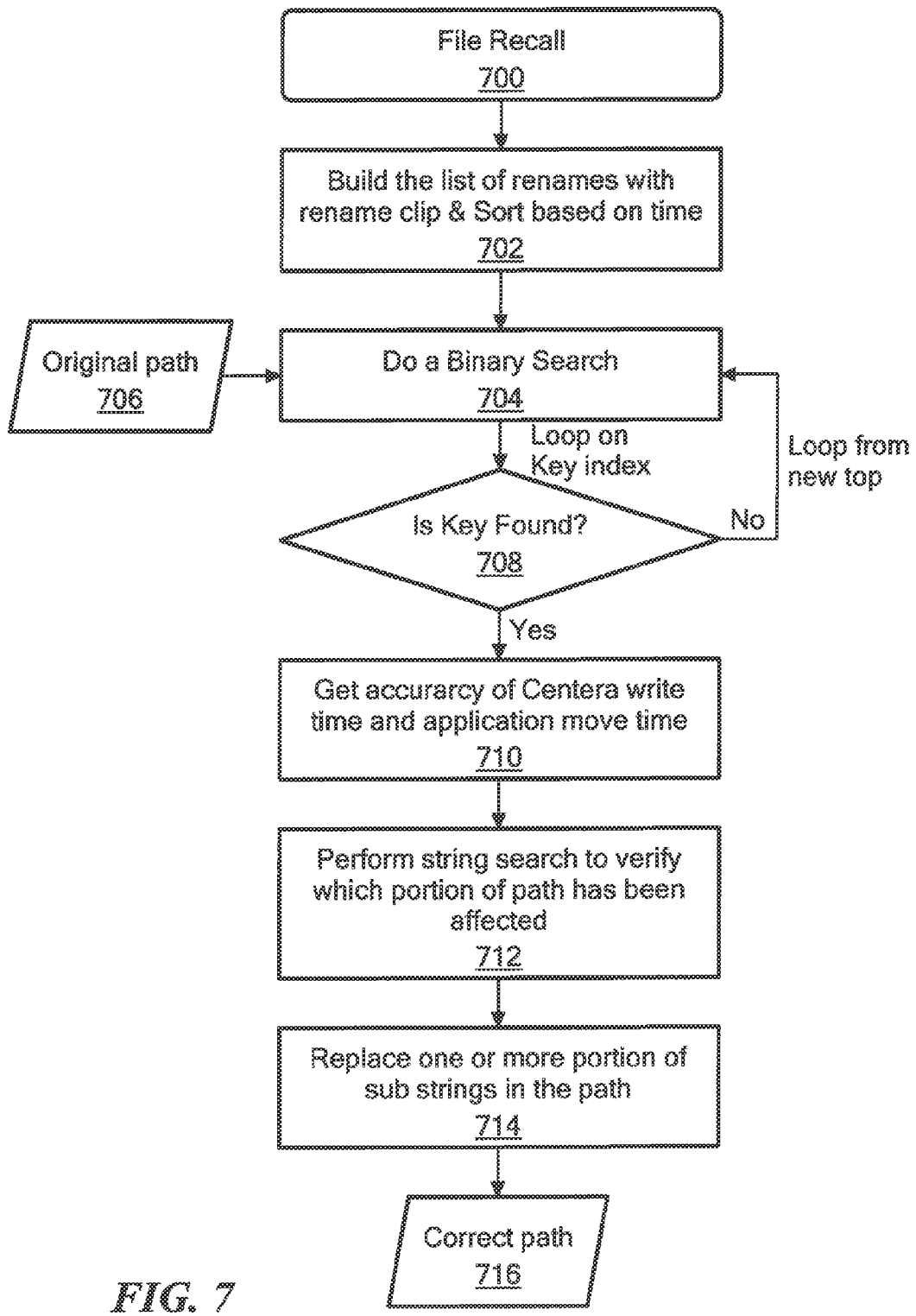
FIG. 7 is a flow diagram showing an exemplary sequence of steps for file recall processing.

FIG. 7 shows an exemplary sequence of steps for recalling a file. in step 700, a file is recalled. In step 702, a list of renames is built using the rename clip and sorted based on time. In step 704, a binary search is performed on time to find the starting entry in the list of renames, as only renames, which are done after the file is moved to the CAS, are required to compute the latest path of the file706. In step 708, it is determined whether the key has been found. If not, processing continues in step 706. If so, in step 710, the accuracy of the CAS write time and the move time is obtained. In step 712, a string search is performed to verify which portion of the path has been affected by the folder rename. In step 714, one or more portions of the path sub strings are replaced to arrive at the correct path name 716 which can be used to find the file.

Figure 8:
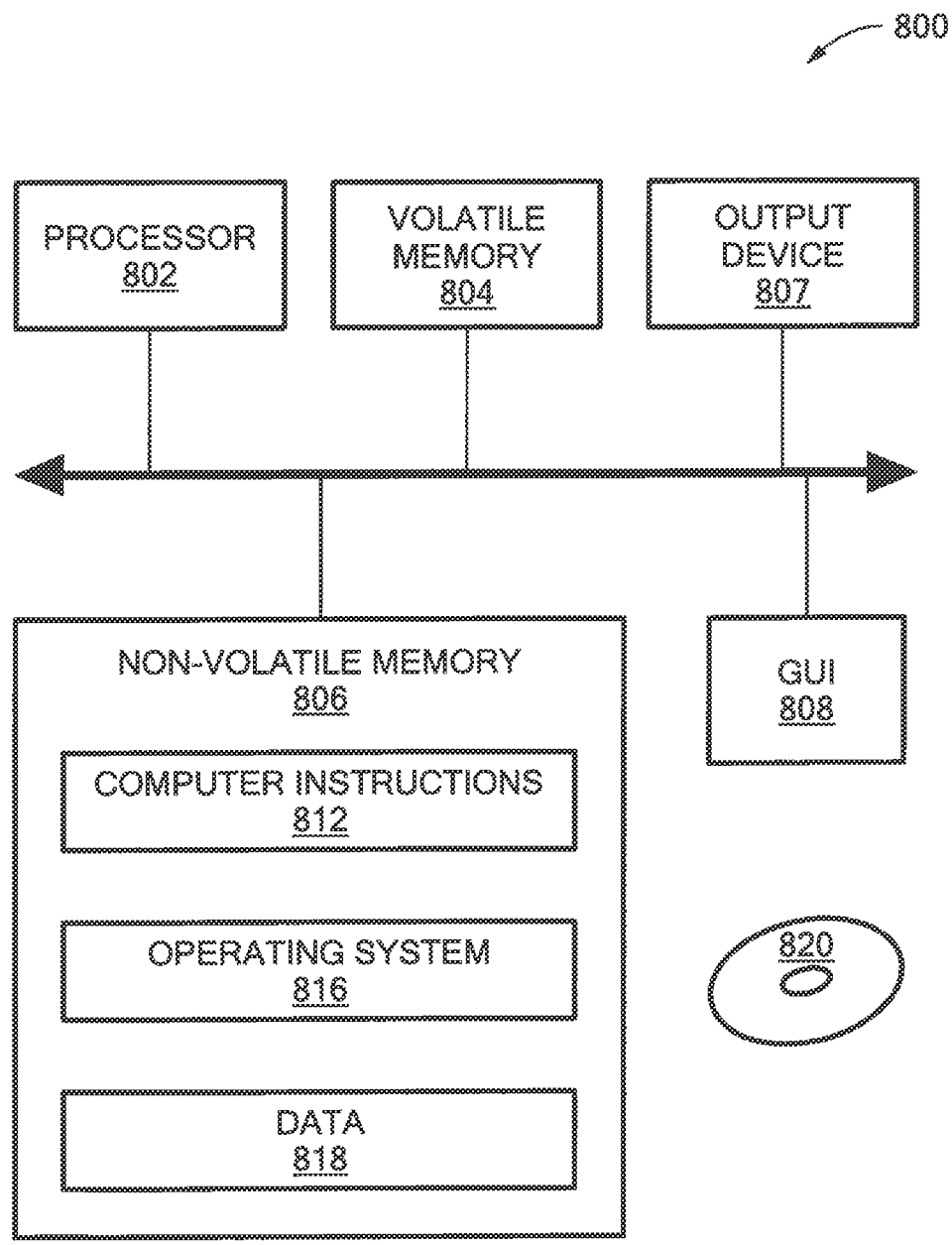
FIG. 8 is a schematic representation of an exemplary computer that can perform at least a portion of the processing described herein.

Exemplary embodiments of the invention provide folder rename functionality that prevents recording irrelevant rename information on to CAS and reduces performance bottlenecks for file recalls since the system flushes the pending rename transactions before a file is recalled. In addition, CAS capacity does not change since objects in CAS are not changed. Further, asynchronous recording of renames are provided so that the user is free from processing lag. Also, FIG. 8 shows an exemplary computer 800 that can perform at least part of the processing described herein. The computer 800 includes a processor 802, a volatile memory 804, a non-volatile memory 806 (e.g., hard disk), an output device 807 and a graphical user interface (GUI) 808 (e.g., a mouse, a keyboard, a display, for example). The non-volatile memory 806 stores computer instructions 812, an operating system 816 and data 818. In one example, the computer instructions 812 are executed by the processor 802 out of volatile memory 804. In one embodiment, an article 820 comprises non-transitory computer-readable instructions.

Processing may be implemented in hardware, software, or a combination of the two. Processing may be implemented in computer programs executed on programmable computers/machines that each includes a processor, a storage medium or other article of manufacture that is readable by the processor (including volatile and non-volatile memory and/or storage elements), at least one to input device, and one or more output devices. Program code may be applied to data entered using an input device to perform. processing and to generate output information.

The system can perform processing, at least in part, via a computer program product, (e.g., in a machine-readable storage device), for execution by, or to control the operation of data is processing apparatus (e.g., a programmable processor, a computer, or multiple computers). Each such program may be implemented in a high level procedural or object-oriented programming language to communicate with a computer system. However, the programs may be implemented in assembly or machine language. The language may be a compiled or an interpreted language and it may be deployed in any form, including as a stand-alone program or as a module, component, subroutine, or other unit suitable for use in a computing environment. A computer program may be deployed to be executed on one computer or on multiple computers at one site or distributed across multiple sites and interconnected by a communication network. A computer program may be stored on a storage medium or device (e.g., CD-ROM, hard disk, or magnetic diskette) that is readable by a general or special purpose programmable computer for configuring and operating the computer when the storage medium or device is read by the computer. Processing may also be implemented as a machine-readable storage medium, configured with a computer program, where upon execution, instructions in the computer program cause the computer to operate.

Processing may be performed by one or more programmable processors executing one or more computer programs to perform the functions of the system. All or part of the system may be implemented as, special purpose logic circuitry (e.g., an FPGA (field programmable gate array) and/or an ASIC (application-specific integrated circuit)).

Having described exemplary embodiments of the invention, it will now become apparent to one of ordinary skill in the art that other embodiments incorporating their concepts may also be used. The embodiments contained herein should not be limited to disclosed embodiments but rather should be limited only by the spirit and scope of the appended claims. All publications and references cited herein are expressly incorporated herein by reference in their entirety.

What is claimed is:

1. A computer-implemented method, comprising:
   in a content addressable storage system, storing a file with an address derived from content of the file and metadata for the file, wherein the metadata for the file includes its path;
   configuring a folder rename flush policy;
   receiving a rename request for the folder;
   filtering a rename flush for the rename request to the content addressable storage system based upon the folder rename flush policy; and
   adding the rename request to a rename clip in response to the folder rename flush not being prevented, wherein the address includes a cryptographic hash of the content and the file metadata, the rename clip contains the folder rename history, and the cryptographic hash for the address is not recomputed for the folder rename request.

2. The method according to claim 1, wherein an archive delay associated with the rename flush policy comprises a given period of time.

3. The method according to claim 1, wherein the rename clip includes original path and new path information, timestamps of Centera CAS and Archiving server.

4. The method according to claim 1, further including logging rename paths in event logs.

5. The method according to claim 1, further including receiving cumulative rename requests for the folder.

6. The method according to claim 5, wherein the cumulative rename requests include a rename request to the original folder name.

7. The method according to claim 1, further including determining a correct path by replacing a sub string in original path for a file written to the content addressable storage system, using information available in the rename clip.

8. An article comprising:
   at least one non-transitory computer-readable medium containing stored instructions that enable a machine to:
   in a content addressable storage system, store a file with an address derived from content of the file and metadata for the file, wherein the metadata for the file includes its path;
   configure a folder rename flush policy;
   receive a rename request for the folder;
   filter a rename flush for the rename request to the content addressable storage system based upon the folder rename flush policy; and
   add the rename request to a rename clip in response to the folder rename flush not being prevented, wherein the address includes a cryptographic hash of the content and the file metadata, the rename clip contains the folder rename history, and the cryptographic hash for the address is not recomputed for the folder rename request.

9. The article according to claim 8, wherein the archive delay comprises a given period of time.

10. The article according to claim 9, wherein the rename clip includes original path and new path information, and timestamps of the content addressable storage system and an archiving server.

11. The article according to claim 9, further including instructions for logging rename paths in event logs.

12. The article according to claim 9, further including instructions for receiving cumulative rename requests for the folder.

13. The article according to claim 12, wherein the cumulative rename requests include a rename request to the original folder name.

14. The article according to claim 8, further including instructions for determining a correct path by replacing a sub string in original path for a file written to the content addressable storage system, using information available in the rename clip.

15. A file archiving system having content addressable storage, comprising:
   at least one processor; and
   at least one memory coupled to the at least one processor, the at least one processor and the at least one memory configured to:
   store a file with an address derived from content of the file and metadata for the file, wherein the metadata for the file includes its path;
   configure a folder rename flush policy;
   receive a rename request for the folder;
   filter a rename flush for the rename request to the content addressable storage system based upon the folder rename flush policy; and
   add the rename request to a rename clip in response to the folder rename flush not being prevented, wherein the address includes a cryptographic hash of the content and the file metadata, the rename clip contains the folder rename history, and the cryptographic hash for the address is not recomputed for the folder rename request.

16. The system according to claim 15, wherein the archive delay comprises a given period of time.

17. The system according to claim 15, wherein the rename clip includes original path and new path information, and timestamps of the content addressable storage system and an archiving server.

18. The system according to claim 15, wherein the at least one processor and memory are further configured to determine a correct path by replacing a sub string in original path for a file written to the content addressable storage system, using information available in the rename clip.

\* \* \* \* \*